Figure 1:
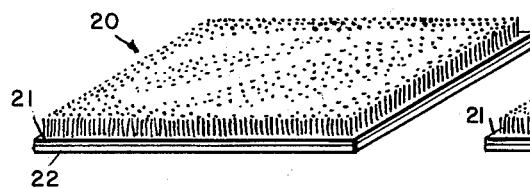

Jan. 19, 1965   R. G. LEVITCH   3,166,455
METHOD OF PRODUCING A LAMINATED CARPET TILE
Filed July 19, 1962   4 Sheets-Sheet 1

INVENTOR.
ROBERT G. LEVITCH
BY
ATTY

Jan. 19, 1965  R. G. LEVITCH  3,166,455
METHOD OF PRODUCING A LAMINATED CARPET TILE
Filed July 19, 1962  4 Sheets-Sheet 2

INVENTOR.
ROBERT G. LEVITCH
BY
*Hyde W. Ballard*
ATTY

Jan. 19, 1965     R. G. LEVITCH     3,166,455
METHOD OF PRODUCING A LAMINATED CARPET TILE
Filed July 19, 1962     4 Sheets-Sheet 3

INVENTOR.
ROBERT G. LEVITCH
BY
*Hyde C. Ballard*
ATTY

Jan. 19, 1965    R. G. LEVITCH    3,166,455
METHOD OF PRODUCING A LAMINATED CARPET TILE
Filed July 19, 1962    4 Sheets-Sheet 4

INVENTOR.
ROBERT G. LEVITCH
BY
*Horace Ballard*
ATTY

United States Patent Office 3,166,455
Patented Jan. 19, 1965

3,166,455
METHOD OF PRODUCING A LAMINATED
CARPET TILE
Robert G. Levitch, Lexington, Va., assignor to James Lees
and Sons Company, Bridgeport, Pa., a corporation of
Delaware
Filed July 19, 1962, Ser. No. 211,035
11 Claims. (Cl. 156—88)

This invention relates to the provision of an improved sectional carpet tile having a pile surface and a resilient back or underlay for each tile. More particularly the tiles are so fabricated that they may be installed in a semi-permanent condition with a non-setting adhesive applied to the back of each tile. In the event that it is desired to relocate or replace the tiles, they may be readily removed from the floor and repositioned.

In recent years the purchasing public has shown considerable interest in the use of soft floor covering applied in squares or sections which give a wall to wall carpeting effect but which do not become a permanent part of a building structure. In addition it has been found highly desirable for non-domestic installations such as schools, offices, auditorium, etc. to be able to remove the carpet installation and to relocate it for the purpose of changing the decorative effect, changing the size of the room or simply to replace damaged or worn-out portions of the carpet surface. The now common use of removable partitions or sliding doors in classrooms, offices and the like, to permit changes with regard to size and shape requires that the floor covering also be adaptable to such change in size, shape and decorating motiff of the installation. Heretofore this could only be accomplished by tearing up a wall to wall installation which in many cases had no further value because of its particular size or shape.

The present invention also lends itself admirably to use in buildings such as schools which have arcuate walls for auditoriums and other rooms built in circular or semi-circular shape.

The primary object of the invention therefore, is to provide a carpet tile or section capable of being installed on a floor in such a manner that it will not slide on the floor but can be removed and re-installed in another location.

A further object of the invention is to provide a method for producing an improved carpet tile having positive non-skid characteristics in addition to an adhesive resilient backing.

A further object of the invention is to provide in a removable carpet tile means for binding the edges of the pile so that all fraying is positively prevented.

A still further object of the invention is to provide a carpet tile having non-rectangular shape and which blends into an overall tile pattern with pleasing effects.

A still further object of the invention is to provide a method of fabricating individual carpet tiles or sections having a semi-tacky backing and means for storing and shipping the sections without damage thereto.

Figure 2:
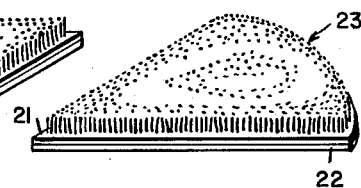
Figure 3:
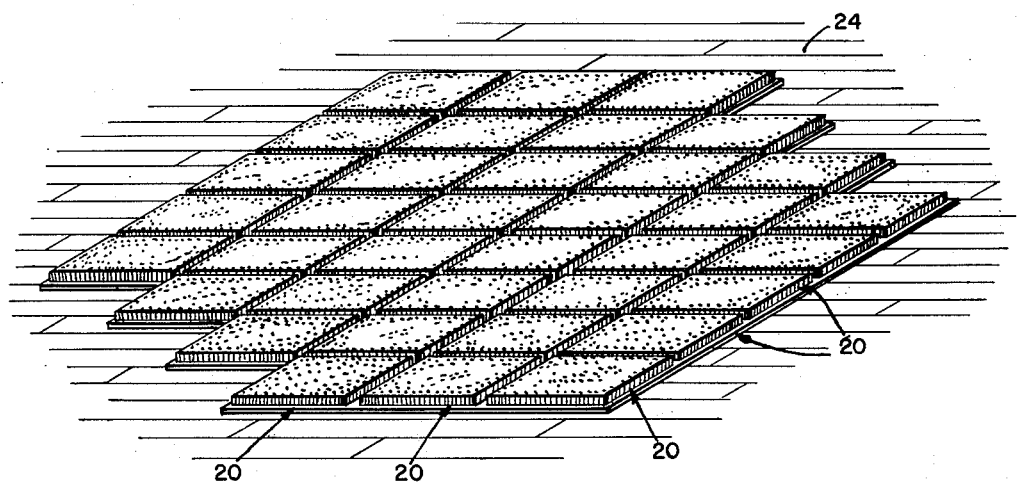
Figure 4:
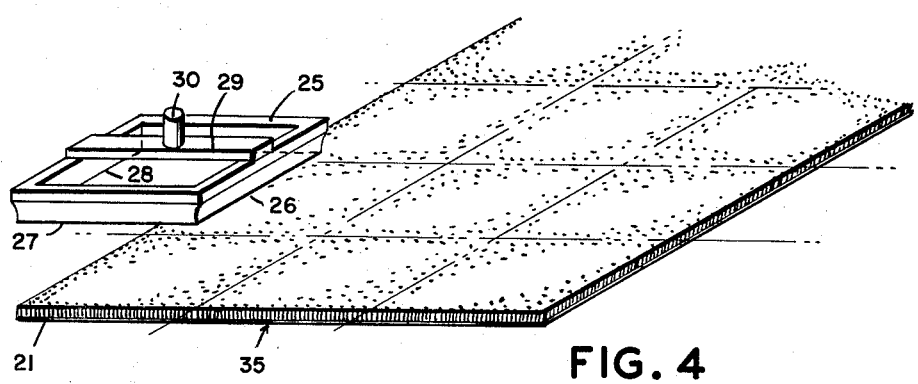
Figure 5:
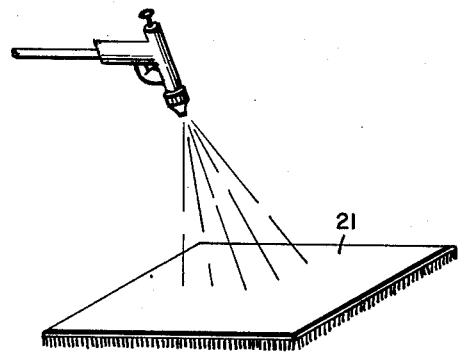
Figure 6:
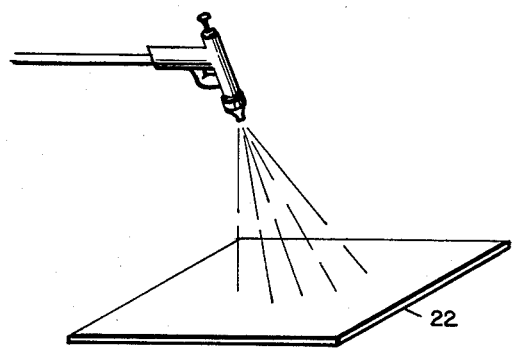
Figure 7:
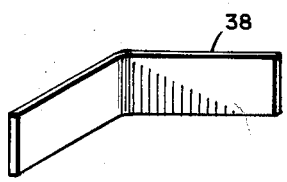
Figure 8:
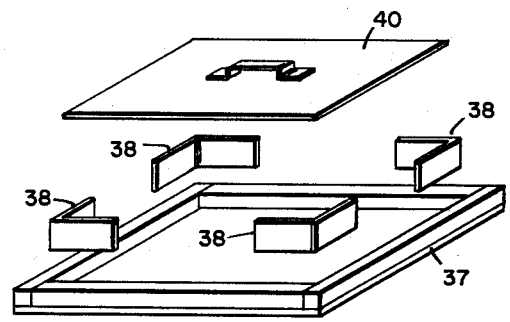
Figure 9:
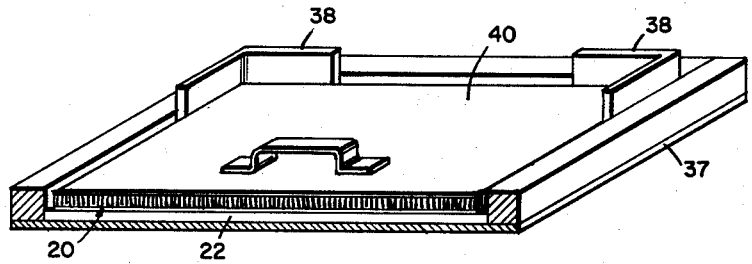
Figure 10:
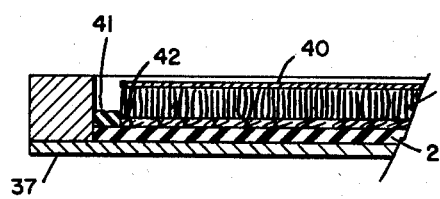
Figure 11:
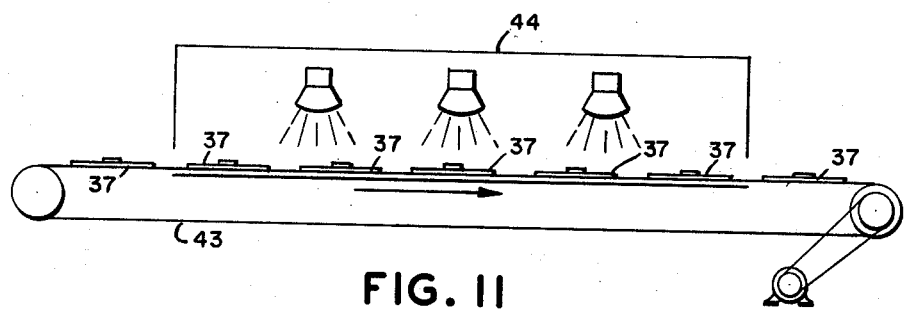
Figure 12:
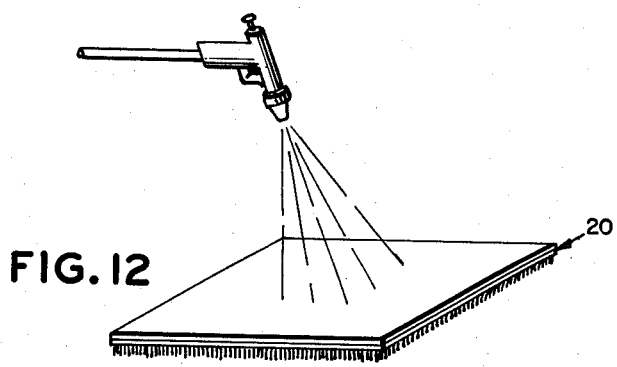
Figure 13:
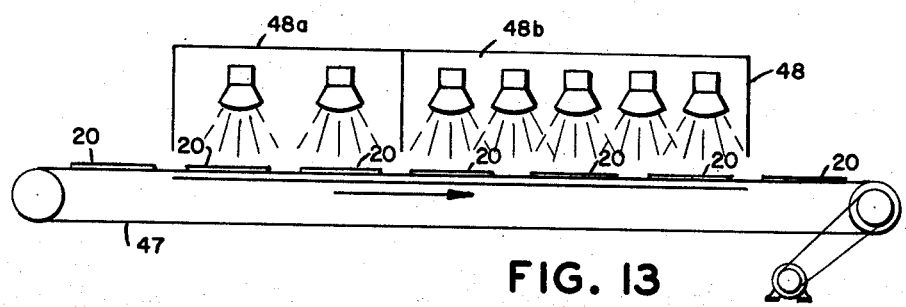
Figure 14:
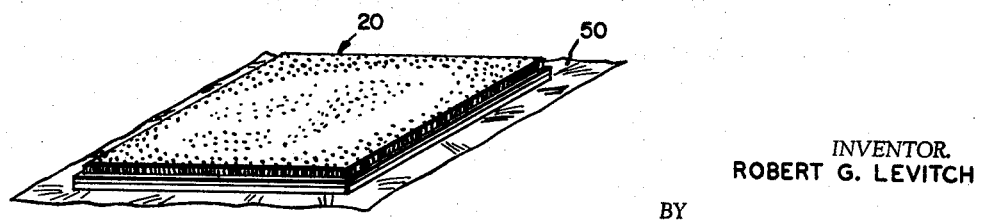

Further objects will be apparent from the specification and drawings in which:

FIG. 1 is a perspective showing a rectangular carpet tile or section constructed in accordance with the present invention, FIG. 2 is a perspective showing a similar carpet tile in the form of a segment of a circle, FIG. 3 is a perspective showing a floor with the section in position and with the pile spacing between sections somewhat enlarged, FIG. 4 is a perspective showing the manner of die cutting the carpet sections from a large roll of carpet, FIG. 5 shows the application of an adhesive to the back of the cut section, FIG. 6 shows the application of an adhesive to one side of a resilient elastomeric underlay for the section of FIG. 5, FIG. 7 is a perspective of one of the corner spacers used in the apparatus of FIGS. 8 and 9, FIG. 8 is an exploded view of the curing jig for vulcanizing the backing to the tile section, FIG. 9 is a view of the jig of FIG. 8 partially sectioned and with the pressure plate in position, FIG. 10 is an enlarged sectional detail showing the application of a sealing compound around the edge of the fabric, FIG. 11 is a diagrammatic view showing the curing of the carpet tiles, FIG. 12 is a perspective showing the application of a permanently tacky compound to the backing, FIG. 13 is a diagrammatic view showing the drying and final curing steps and FIG. 14 is a perspective of the final carpet tile ready for storage or shipment.

The invention comprises essentially the cutting of a geometric shape of pile fabric and applying by means of a partial cure a sponge or resilient backing to the fabric in such a way that the resilient backing extends slightly beyond the edges of the carpet per se. After a preliminary cure a sealing compound is applied around the edges of the fabric to eliminate the possibility of fraying of the pile and to insure a permanent seal or bind between the fabric section and the backing. The section is then dried and subjected to a second curing step whereupon a semi-tacky adhesive which does not set permanently is applied to the underside of the backing and a protective synthetic sheet material positioned over the backing to prevent undesired adhesion of the section until the section is ready for actual installation.

Referring now more particularly to the drawings a carpet tile or section 20 comprises a pile surface 21 secured to a resilient backing 22 which may desirably be a sheet of elastomeric material such as sponge or foam rubber. The section of FIG. 1 is desirably about 18" square since such a dimension lends itself readily to installation in the ordinary room or office. It will be understood however, that the shape of the tile may be square, rectangular or any other required size or shape such as the pie shaped segment 23 shown in FIG. 2.

The tiles when installed on a floor or sub-floor 24 (FIG. 3) give a distinct parquet or sectionalized appearance which is contrary to previous sections in which it has been an object to conceal the joints as much as possible. It has been found that the provision of a pile carpet tile having concealed joints invariably results in frayed pile ends which become detached from the section during service or in normal cleaning operations. The practical result is that the floor covering designed to conceal the joints between the sections soon fails to accomplish this object because of missing pile tufts at the joints due to crushing the inability to sufficiently bind the edge tufts when cutting the tile. In the present invention it is not attempted to conceal the joints in the floor covering and it has been found that a sufficiently satisfactory appearance is achieved when the size and shape of the tiles are quite apparent. In so doing, it is possible to produce a far more satisfactory carpet tile from the standpoint of eliminating undesired pile tufts or projections since all of the projections in the present invention are securely and permanently bound in the tiles.

In producing the improved carpet tile or section in the present invention I employ a die 25 (FIG. 4) having four edges 26, 27, 28 and 29. This die is positioned in a suitable press (not shown) and retained therein by means of a post 30. The roll of carpet 35 from which the sections are to be cut is then positioned underneath the die in such a way that it is lowered under pressure to cut out a piece or section of carpet of the size and shape desired.

The next step in the method of the present invention is to cut a section of foam or sponge rubber material 22 slightly wider and longer than the fabric section 21. The fabric section 21 is then subjected to an application of an adhesive which may be a latex or resinous type. The same adhesive is applied to one side of the elastomeric backing 22 as shown in FIG. 6. The backing 22 is then positioned in the matrix 37 of a mold (FIG. 8) with the adhesive uppermost. Four angle or corner spacers 38, 38 are then placed at each corner of the matrix as shown in FIG. 8 and FIG. 9 whereupon the fabric section 21 is positioned and aligned in the matrix between the four spacers 38, 38. These spacers maintain an overlap of the backing 22 with respect to the carpet 21. The pressure platen 40 is then placed on the top of the carpet section 21 as shown in FIG. 9. The spacers 38 can then be removed as the carpet section 21 will not be displaced with respect to the backing due to the presence of the adhesive.

A latex or other suitable elastomeric or resinous compound is then applied all around the edge of the backing 22 to seal the pile tufts and the section 21 to the backing 22. This compound 41 is preferably applied with sufficient thickness to cover the base of the pile projections 42 in the section 21 so that any projections which are partially loosened are now securely anchored in position.

After the latex has been applied around the entire edge of the backing 22 the mold is placed on a conveyor 43 and introduced into a preliminary drying and partial curing oven 44 (FIG. 11). The treatment in oven 44 comprises a pass for approximately 10 minutes at a temperature 270° F. This partially cures the latex as well as the adhesive between the backing 22 and the carpet 21. The tiles are then removed from the mold and the matrix 37 and a premanently tacky compound or adhesive is sprayed on the back of the partially cured section as shown in FIG. 12.

This compound is applied when the section is cold and may be an adhesive of the type sold on the market as "Dispersite 1651 XA." The tiles are then placed on a second conveyor 47 (FIG. 13) and treated in an oven 48a to dry the tiles in the first zone at a temperature of 200° F. for 5 minutes. The conveyor then advances the tiles in an upside down position to the second zone 48b, where they are cured for 5 to 10 minutes at a temperature of 270° F. The tiles are then removed and permitted to cool and a polyethylene sheet 50 is applied to the permanently tacky "Dispersite" on the backing. The tiles are now ready to be stored or shipped as may be desired to any location for installation.

When the floor on which the tiles are to be installed is clean of all loose dirt or foreign material, the backing sheet 50 can be removed and the tiles installed in close abutting relationship as shown in FIG. 2 and the tiles will not slide nor move on the floor but can be removed individually or in sections for replacing with other designs or other rooms. Also it is a simple matter to replace any particular tile or tiles in the event of permanent wear or damage.

The carpet tiles constructed in accordance with the present invention are far more satisfactory and acceptable than heretofore constructed in which the tile joints are initially concealed. Every pile projection in the present tile is securely bound in the backing not only by the construction of the carpet but the provision of the vulcanized backing as well as the vulcanized trim along the border or edge of each section. The ability to provide removable tile which is not subject to fraying or loss or tufts in any part of its area represents a substantial contribution to the needs of present-day soft surface floor covering.

It will be understood that the particular type of adhesive employed will depend upon optimum conditions, and may be a heating; setting; or any other satisfactory adhering process using sealing compounds adaptable to the particular conditions. The preliminary cure may, if desired, be eliminated so that the adhering or vulcanizing is performed in a single step.

Having thus described my invention, I claim:

1. The method of producing a laminated carpet tile which comprises the steps of cutting a section of pile fabric to a predetermined shape, cutting a section of backing material in the same shape as the fabric section but with sufficiently greater dimensions to provide an extended marginal edge when the fabric section and the backing material are superposed, adhering the fabric section and the backing material together to provide said extended marginal edge, placing the adhered backing and fabric in a mold, maintaining said marginal edge around the fabric section, applying a heat curable sealing compound around said marginal edge, and curing the thus formed laminated section at an elevated temperature.

2. The method of producing a laminated carpet tile which comprises the steps of cutting a section of pile fabric to a predetermined shape, cutting a section of backing material in the same shape as the fabric section but with sufficiently greater dimensions to provide an extended marginal edge, applying an adhesive to one side of either the pile fabric or the backing material, placing the fabric and the backing material in superposed position in a mold, maintaining the marginal edge between the fabric and the backing material, applying a heat curable sealing compound around the marginal edge, subjecting the fabric and the backing material to a preliminary curing treatment at an elevated temperature, applying a non-setting permanently tacky compound to the exposed face of the backing material, drying the laminated fabric and backing material in the first zone, and finish curing the laminated fabric and backing material in a second zone at an elevated temperature.

3. The method of claim 2 wherein backing material is foam rubber and the preliminary curing treatment is at a temperature of approximately 270° F. for 10 minutes.

4. The method of claim 2 wherein the backing material is foam rubber and the drying takes place at approximately 200° F. for 5 minutes.

5. The method of claim 2 wherein the backing material is foam rubber and the finished curing takes place at approximately 275° F. for 5–10 minutes.

6. The method of claim 2 in which the sealing compound around the marginal edge is a latex.

7. The method of producing a laminated carpet tile which comprises the steps of cutting a section of pile fabric to a predetermined shape, cutting a section of backing material in the same shape as the fabric section but with sufficiently greater dimensions to provide an extended marginal edge, applying an adhesive to one side of either the pile fabric or the backing material, placing the fabric and the backing material in superposed position in a mold, maintaining the marginal edge between the fabric and the backing material, applying a heat curable sealing compound around the marginal edge, subjecting the fabric and the backing material to a preliminary curing treatment at an elevated temperature, applying a non-setting permanently tacky compound to the exposed face of the backing material, drying the laminated fabric and backing material in the first zone, and applying a protective sheet to the permanently tacky surface of the backing material.

8. The method of claim 7 wherein the backing material is foam rubber and the preliminary curing treatment is at a temperature of approximately 270° F. for 10 minutes.

9. The method of claim 7 wherein the backing material is foam rubber and the drying takes place at approximately 200° for 5 minutes.

10. The method of claim 7 wherein the backing material is foam rubber and the finished curing takes place at approximately 275° for 5–10 minutes.

11. The method of claim 7 wherein the backing material is foam rubber and the sealing compound around the marginal edge is a latex.

References Cited in the file of this patent

UNITED STATES PATENTS

| | | |
|---|---|---|
| 1,271,005 | Bartlett | July 2, 1918 |
| 2,187,140 | Faris et al. | Jan. 16, 1940 |
| 2,254,210 | Cunnington | Sept. 2, 1941 |
| 2,753,597 | Bird et al. | July 10, 1956 |
| 2,760,895 | Holgerson | Aug. 28, 1956 |
| 3,010,859 | Stephens et al. | Nov. 28, 1961 |
| 3,014,829 | Curtin | Dec. 26, 1961 |
| 3,041,224 | Sherts et al. | June 26, 1962 |
| 3,074,835 | Gordon | Jan. 22, 1963 |